United States Patent

[11] 3,626,087

[72] Inventor Masao Tomioka
Urawa-shi, Japan
[21] Appl. No. 864,330
[22] Filed Oct. 7, 1969
[45] Patented Dec. 7, 1971
[73] Assignee Sony Corporation
Tokyo, Japan
[32] Priority Oct. 7, 1968
[33] Japan
[31] 43/72977

[54] MAGNETIC RECORDING AND REPRODUCING DEVICE FOR COLOR VIDEO SIGNALS
6 Claims, 10 Drawing Figs.

[52] U.S. Cl. .......... 178/5.4 CD, 178/5.2 A, 178/6.6 A
[51] Int. Cl. .......... H04n 5/78, H04n 7/12, H04n 9/44
[50] Field of Search .......... 178/6.6 A, 5.2 A, 5.4 CD

[56] References Cited
UNITED STATES PATENTS
Re.26,412 6/1968 Dolby et al. .......... 178/5.4
2,960,563 11/1960 Anderson .......... 178/5.4

*Primary Examiner*—Bernard Konick
*Assistant Examiner*—Steven B. Pokotilow
*Attorneys*—Lewis H. Eslinger, Alvin Sinderbrand and Curtis, Morris & Safford

ABSTRACT: A magnetic-recording device for video signals has means for discriminating between a composite color video signal and a monochrome video signal and means for driving an oscillator which generates a pilot signal of a chrominance signal only when a composite color video signal is being recorded so that no pilot signal is recorded to interfere with the reproduction of a monochrome video signal.

INVENTOR.
MASAO TOMIOKA

INVENTOR.
MASAO TOMIOKA

INVENTOR.
MASAO TOMIOKA

INVENTOR.
MASAO TOMIOKA

MAGNETIC RECORDING AND REPRODUCING DEVICE FOR COLOR VIDEO SIGNALS

BACKGROUND OF THE INVENTION

1. Field of the Invention

This invention relates generally to a magnetic-recording and reproducing device for video signals, and more particularly to a magnetic-recording and reproducing device in which a composite color video signal and a monochrome video signal are automatically discriminated from each other for recording or reproducing.

2. Description of the Prior Art

In accordance with the NTSC color TV system, the color television signal, that is, a composite color signal, consists of a luminance signal and a modulated chrominance signal having its frequency band contained within the luminance signal band. The modulated chrominance signal band is produced by amplitude-modulating, with I and Q chrominance signals, color subcarriers having a frequency which is an odd multiple of one-half that of the horizontal scanning lines, that is, a frequency of 3.579 ... mc. (hereinafter referred to as 3.58 mc. for the sake of brevity) and being 90° out of phase. Conventional systems for recording and reproducing such a composite color television signal frequency-modulate a carrier wave directly with the composite color television signal and the resulting frequency-modulated signal is magnetically recorded and reproduced. With these conventional systems, however, the normal limitations in the mechanical accuracy of the magnetic recording and reproducing apparatus and in the signal transmission characteristics of the electric circuits incorporated therein introduce a disagreement in the hue of the chrominance signals, a variation in the response of the chrominance signals and the generation of moires in the reproduced picture. In apparatuses capable of recording and reproducing both color video signals and monochrome video signals, a switch is manually changed over selectively for the color mode operation or for the monochrome mode of operation.

A method for eliminating the aforementioned defects has been proposed in the U.S. Pat. application, Ser. No. 775,277 filed by Toshihiko Numakura on Nov. 13, 1968 and assigned to the assignee of the present invention. The invention disclosed in the above application avoids the aforementioned defects but is defective in that, during recording of monochrome video signals, a pilot signal is simultaneously recorded on a magnetic medium and exerts a bad influence on the picture subsequently reproduced from the recorded signals.

SUMMARY OF THE INVENTION

The present invention provides a magnetic-recording and reproducing device for video signals which includes means for separating a color video signal into a chrominance signal and a luminance signal, means for producing a signal by which the chrominance signal is converted to a frequency band lower than that of the luminance signal, means for detecting the presence of a burst signal in the luminance signal and means for controlling the output of the signal-producing means with the output of the detecting means.

Accordingly, one object of this invention is to provide a novel magnetic recording and reproducing device.

Another object of this invention is to provide a magnetic-recording and reproducing device which discriminates between a color video signal and a monochrome video signal and is automatically switched for the color mode of operation or the monochrome mode of operation.

A further object of this invention is to provide a magnetic-recording and reproducing device which provides a monochrome video signal with high resolution.

Still a further object of this invention is to provide a magnetic-recording and reproducing device which is adapted to be smoothly changed over between color video recording and monochrome video signal recording.

The above, and other objects, features and advantages of this invention, will become apparent from the following description taken in conjunction with the accompanying drawings.

Figure 1:
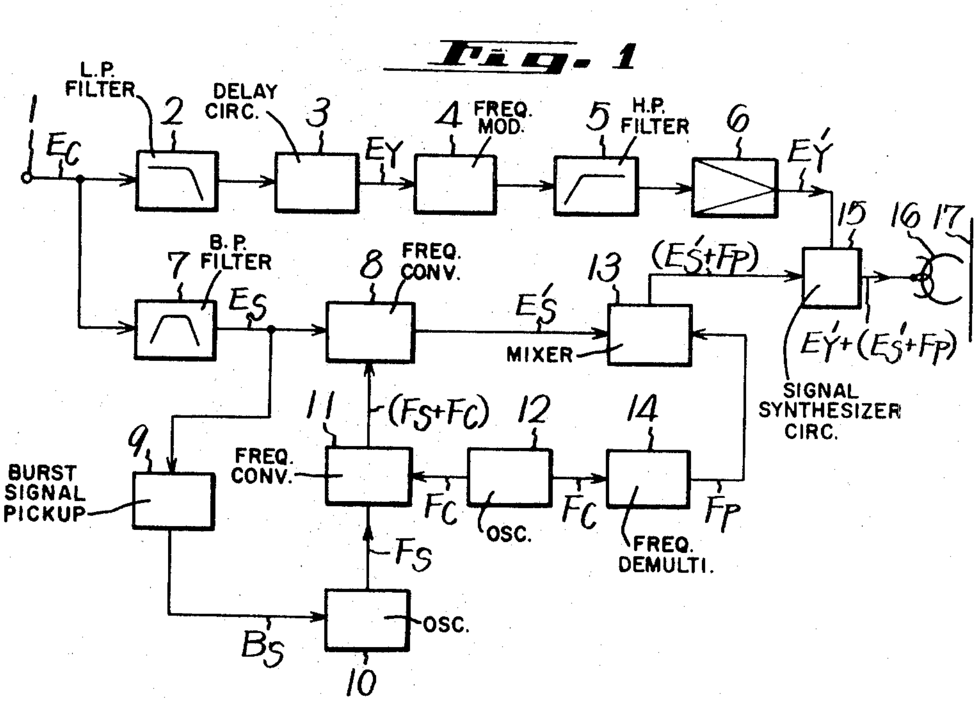
FIG. 1 illustrates in block form one example of a color television signal-transmission system as applied to a magnetic-recording system, for explaining this invention.
Figure 2:
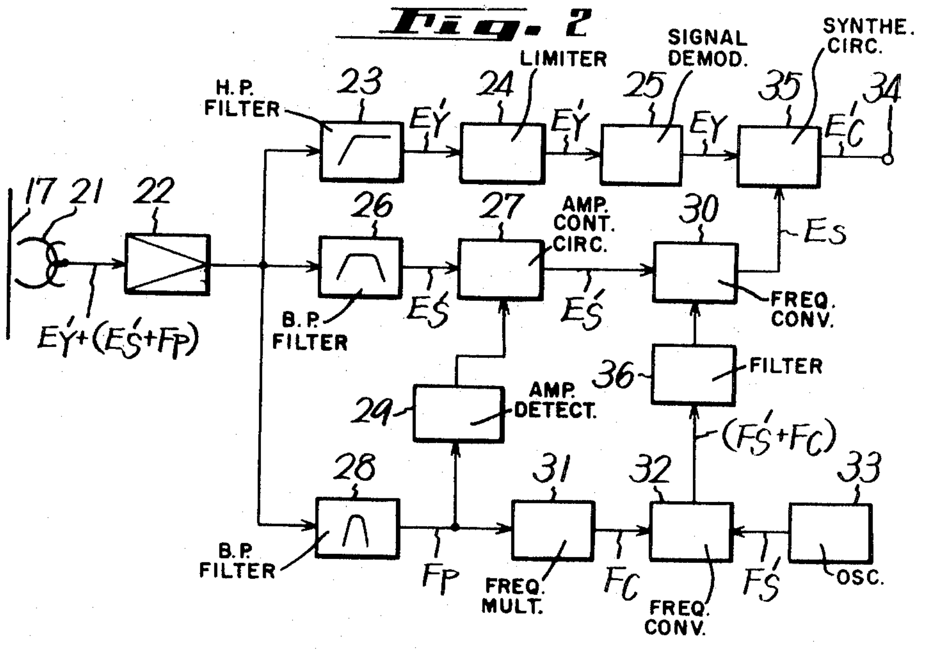
FIG. 2 illustrates in block form one example of a reproducing system corresponding to the recording system of FIG. 1.
Figure 4:
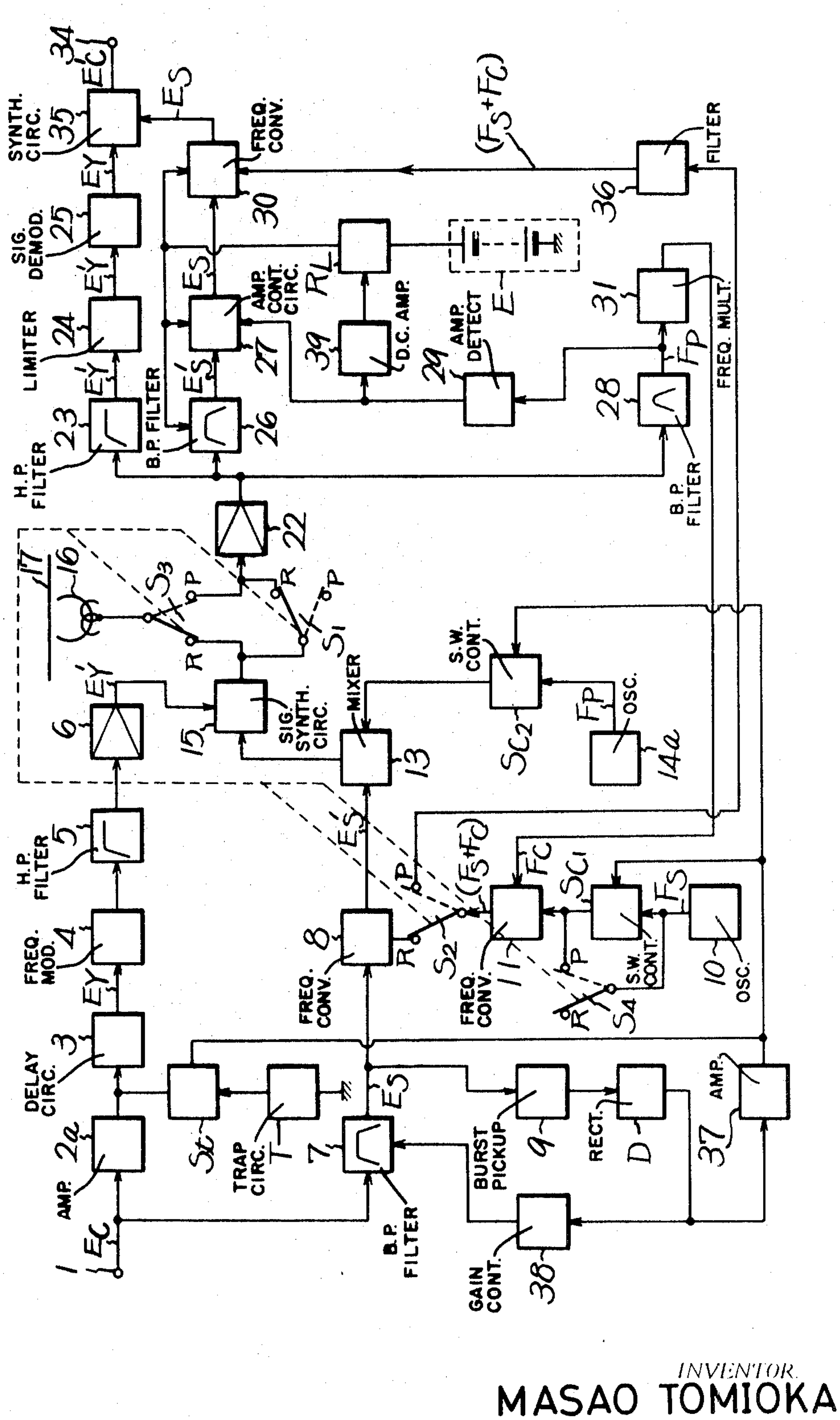
Figure 5:
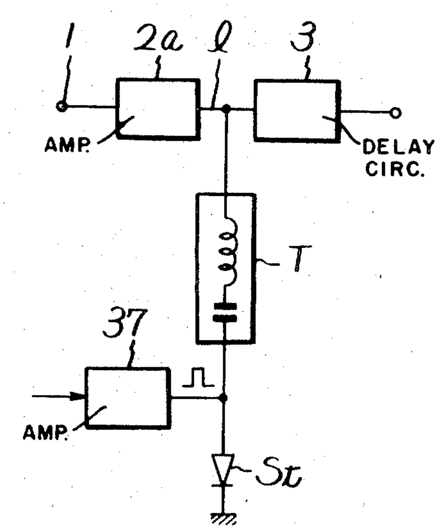

FIGS. *3a–3f* show a series of frequency spectra produced when the signal-transmission system is applied to the magnetic-recording and reproducing systems shown in FIGS. 1 and 2;

FIG. 4 is a block diagram illustrating one example of the device of this invention; and FIG. 5 is a connection diagram showing a concrete example of one portion of the device exemplified in FIG. 4.

DESCRIPTION OF THE PREFERRED EMBODIMENTS

Figure 3A:
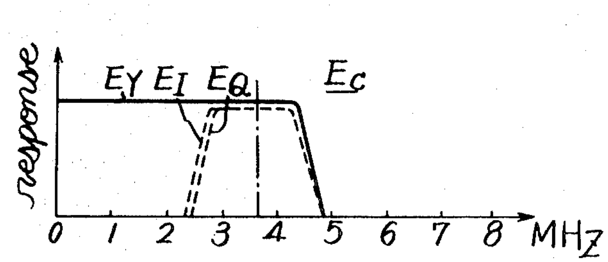
Figure 3B:
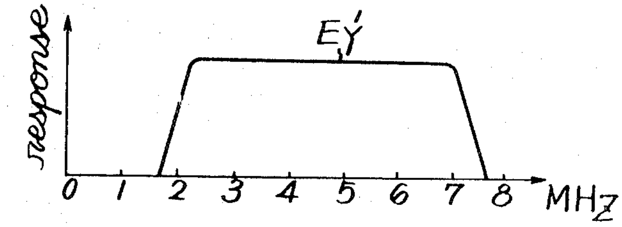

In FIG. 1, reference numeral 1 indicates an input terminal for receiving a composite color television signal $E_C$ (hereinafter referred to as a composite signal $E_C$) of the NTSC type. As illustrated in FIG. 3A, such composite signal $E_C$ consists of a luminance signal $E_Y$ (hereinafter referred to as a Y signal) and modulated I and Q signals $E_I$ and $E_Q$ which are produced by amplitude-modulation of color subcarriers having a frequency of 3.58 MHz. and being 90° out of phase and have their frequency bands contained within the luminance signal band. The composite signal $E_C$ is applied to a frequency modulator 4 through a low-pass filter 2 of, for example, about 3 MHz. and a delay circuit 3. In modulator 4, the carriers are frequency-modulated by the Y signal $E_Y$ in such a manner that the crest of, for example, its synchronizing signal may be 4.5 MHz. and the white peak level may be 6.0 MHz. The resulting frequency-modulated Y signal thus produced is fed through a high-pass filter 5 to a record amplifier 6, from which is derived a frequency-modulated Y signal $E_Y'$, such as shown in FIG. 3B which has a frequency band width of, for example, approximately 2 to 7 MHz.

Figure 3C:
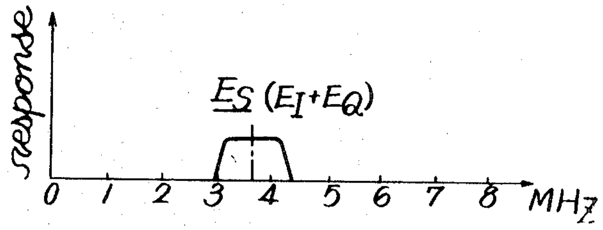

Further, the composite signal $E_C$ is applied to a band-pass filter 7 to produce a modulated chrominance signal $E_S$ such as is depicted in FIG. 3C which has a frequency band width of, for example, ±0.6 MHz. about the color subcarrier frequency of 3.58 MHz. in the frequency bands of the I and Q signals $E_I$ and $E_Q$. The modulated chrominance signal $E_S$ thus produced is fed to a frequency converter 8 of the balanced-modulator-type. A portion of the modulated chrominance signal $E_S$ derived from the band-pass filter 7 is also fed to a burst signal pickup circuit 9 to produce a burst signal $B_S$ of 3.58 MHz., which is applied to, for example, a crystal oscillator 10 of 3.58 MHz. to lock is oscillation frequency at the burst signal frequency.

A signal $F_S$ of 3.58 MHz. derived from the oscillator 10 is applied to a frequency converter 11. The frequency converter 11 is supplied with a signal $F_C$ of 1.06206 ... MHz. (hereinafter simplified as 1.06 mc. for the sake of brevity) from, for example, a crystal oscillator 12. Therefore, if the frequencies of the signals $F_S$ and $F_C$ are taken as $f_s$ and $f_c$, a signal $(F_S + F_C)$ of $f_s + f_c$=4.64 MHz. is produced by the frequency converter 11 and is fed to the frequency converter 8.

Figure 3D:
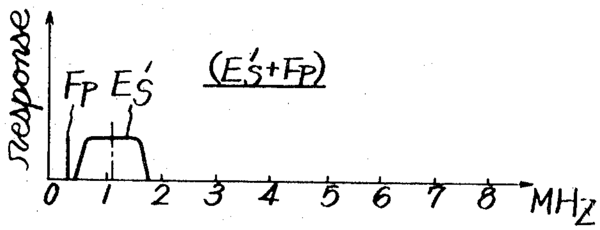

As a result of the above, the frequency converter 8 produces a modulated chrominance signal $E_S'$ such as is depicted in FIG. 3D in which the carrier frequency $f_c$ is suppressed and which has a frequency band width of approximately ±0.6 MHz. about a frequency of 1.06 MHz., that is, the modulated chrominance signal $E_S$ is beaten down by the frequency converter 8 to provide such a modulated chrominance signal $E_S'$, which is fed to a mixer 13.

The signal $F_C$ of 1.06 MHz. from the oscillator 12 is also applied to a frequency demultiplier circuit 14 to produce a signal of a frequency of, for example, 1.06/3 MHz., which is applied as a pilot signal $F_P$ to the mixer 13. Accordingly, the mixer 13 produces a signal $(E_S'+F_P)$ such as is shown in FIG. 3D in which the pilot signal $F_P$ is located below the lower limit of the frequency band of the modulated chrominance signal $E_S'$.

Figure 3E:
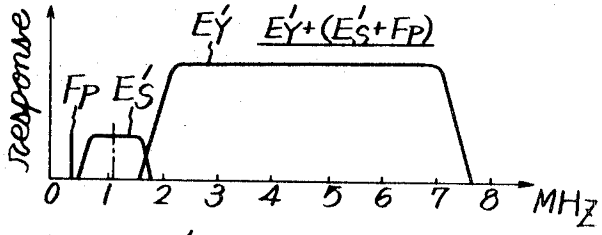

The resulting signal $(E_S'+F_P)$ and the signal $E_Y'$ derived from the record amplifier 6 are supplied to a signal synthesizer circuit 15 to produce a composite signal $(E_Y'+(E_S'+F_P))$ such as is shown in FIG. 3E in which the frequency band of the signal $(E_S'+F_P)$ is juxtaposed to the lower limit of the frequency band of the signal $E_Y'$ so as to be at most only in partly overlapping relationship therewith, and the resulting composite signal is recorded by a magnetic head 16 on a magnetic tape 17.

The foregoing generally outlines one example of the recording portion of a magnetic-recording and reproducing device as proposed in the aforementioned U.S. Pat. application, Ser. No. 775,277. However, a further description will be given of the relationship between the frequency $f_s$ of the signal $F_S$ and the frequencies $f_c$ and $f_p$ of the signals $F_C$ and $F_P$.

The frequency $f_s$ is the same as the frequency of the color subcarriers for the modulated chrominance signal and is selected to be an odd multiple of one-half the horizontal scanning frequency $f_h$. More precisely, the frequency $f_s$ is selected to be ½ $f_h$×455 which equals 3.579545 ... MHz. Further, the frequency of the color subcarriers is selected to be at such a value that the frequency spectra of the color subcarriers modulated by the chrominance signals will be located and in harmonics of the Y signal in the interpolated relation thereto.

The frequency $f_c$ is also selected to be an odd multiple of ½ $f_h$ so as to be determined by the frequency-interpolating method. Hence, $f_c=½f_h×(2n-1)$, where $n$ is an integer. In the foregoing example, the integer $n$ was selected to be 68 in order that the frequency $f_c$ might be sufficiently lower than the frequency $f_s$. In selecting such integer, attention was given to the avoidance of beat interference between higher harmonic components having great energy, such as the first order and a second order higher harmonic of the frequency $f_c$, and the frequency $f_s$ of the color subcarriers of the chrominance signal $E_S$. Further, by selecting the frequency $f_c$, as above, the frequency band of the frequency-converted signal $E_S'$ is sufficiently depressed to prevent the frequency band of the frequency-converted chrominance signal $E_S'$ from being affected by phase variations occurring in the recording system.

The frequencies $f_c$ and $f_s$ are not interlocked with each other, as the relationship between the frequency $f_p$ and the frequency of the luminance signal can easily be made close to a frequency-interpolated relationship. If the frequency was to be interlocked with the frequency $f_s$, the burst signal $B_S$ could be supplied to a signal generator adapted to provide a signal having a frequency equal to a common multiple of the frequencies $f_s$ and $f_c$, and the resulting signal or a frequency-demultiplied signal could be applied to the oscillator 12. However, the foregoing requires a complicated arrangement, and such synchronous locking is not effective. Rather, the frequency $f_p$ is determined from its interrelationship to the frequency $f_c$, but it is not necessarily so selected as to intentionally achieve a frequency-interpolated relationship between the frequencies $f_p$ and $f_c$ in respect of their spectrum. The frequency $f_p$ can easily be obtained from the frequency $f_c$ merely by demultiplying the latter, and it can be located substantially in frequency-interpolated relationship to the frequency $f_c$. Thus, the frequency $f_p$ is given by $f_p=f_c/m$ where $m$ is an integer. To make $f_p$ sufficiently lower than $f_c$, $m$ may be selected to be 3, for example, which results in $f_p$=1.06/3 MHz. By giving such a low value to frequency $f_p$, the pilot signal $F_P$ is relatively free from phase variations occurring in the color television signal transmission system.

The signal $(E_Y'+(E_S'+F_P))$ to be supplied to the magnetic head 16 is preferably provided with a level difference between signals $E_Y'$ and $E_S'$ so that the level ratio of $E_Y'$ to $E_S'$ becomes 1:0.1~0.03 on the basis of the recording current flowing through the magnetic head 16. That is, the level ratio of signal $E_S'$ is from about 3 to 10 percent of the level ratio of $E_Y'$. Furthermore, the level ratios of $E_S'$ and $F_P$ are selected so that the level of $F_P$ is lower than that of $E_S'$ or at most equal to the level of the latter. In practice, therefore, it is possible to supply the signal $(E_S'+F_P)$ directly to the synthesizer circuit 15 while only the signal $E_Y'$ is supplied to the latter through the amplifier 6. Furthermore, the circuit 15 may be constituted merely by connections of the output terminals of the amplifier 6 with the output terminals of the mixer 13.

One reason why $E_Y'$ and $E_S'$ are provided with different levels, as described above, is that $F_P$ and $E_S'$ are simultaneously recorded and reproduced with relatively great amplitudes under the high-frequency-biasing action produced by $E_Y'$ since the frequencies of $F_P$ and $E_S'$ are low. Another reason is that, even if cross modulation occurs among $E_Y'$, $E_S'$ and $F_P$, the amplitude of any signals resulting from such cross modulation is sufficiently low so that the cross modulation components can easily be removed from signal $E_Y'$ by means of a limiter.

Figure 3F:
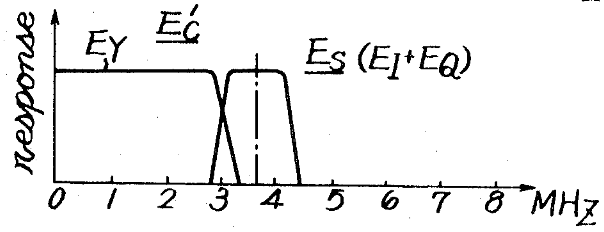

Referring now to FIG. 2, it will be seen that the combined signal $(E_Y'+(E_S'+F_P))$ described above in connection with FIG. 3E and which has been recorded on the tape 17 may be reproduced by a magnetic head 21 disposed in contact with the tape. The combined signal thus reproduced is supplied to a playback amplifier 22, and thence through a high-pass filter 23 to a limiter 24 in which the Y signal $E_Y'$, as shown in FIG. 3B, is reproduced. The high-frequency response is dropped or partly cut off if limitation is imposed upon the high-frequency transmission characteristics of the magnetic tape and magnetic head. Then the Y signal $E_Y'$ is supplied to a signal demodulator 25 from which is obtained a luminance signal $E_Y$, having a frequency band as shown in FIG. 3F, and which is in turn supplied to a synthesizer circuit 35. A part of the signal $(E_Y'+(E_S'+F_P))$ provided by the playback amplifier 22 is supplied to a band-pass filter 26 so that a modulated chrominance signal $E_S'$, such as is shown in FIG. 3D, is obtained therefrom for feeding to an amplitude control circuit 27. Also, a part of the reproduced signal $(E_Y'+(E_S'+F_P))$ is supplied to a band-pass filter 28 from which the pilot signal $F_P$ is obtained. The pilot signal $F_P$ is supplied to an amplitude detecting circuit 29 adapted to detect variations in the amplitude of the pilot frequency $F_P$ and to provide a DC output which varies in accordance with changes in the amplitude of the signal $F_P$ and is supplied to the amplitude controlling circuit 27 for causing the latter to automatically control the amplitude of the signal $E_S'$.

The amplitude-controlled signal $E_S'$ available from the control circuit 27 is then supplied to a frequency converter 30. The pilot signal $F_P$ is also supplied to a frequency multiplier 31 so that there is obtained a signal $F_C$ having a frequency $f_c$ which is three times as high as the frequency $f_p$=1.06/3 MHz. of the pilot signal $F_P$. That signal $F_C$ is supplied to a frequency converter 32 which also receives a frequency signal $F_S'$ from a crystal oscillator 33 having a frequency of 3.58 MHz. The converter 32 provides a signal $(F_S'+F_C)$ having a frequency $(f_s=f_c)$=4.64 MHz., and which is in turn supplied to the frequency converter circuit 30 so that the latter shifts the frequency band of signal $E_S'$ substantially back to that of chrominance signal $E_S$ shown on FIG. 3C, and such modulated chrominance signal $E_S$ is also supplied to the synthesizer circuit 35.

Consequently, a reconstituted composite color video signal $E_C'$, as shown on FIG. 3F, and which generally corresponds to the composite signal $E_C$ of FIG. 3A, is obtained at an output terminal 34 of the synthesizer circuit 35.

Even if the phases of the pilot signal $F_P$ and modulated chrominance signal $E_S'$ are changed in the described magnetic recording and reproducing device, such phase variations are substantially equal to each other since both of these signals are magnetically recorded and reproduced while being maintained in relatively low frequency bands. Consequently, any phase variation of the signal $F_C$ provided by the frequency-multiplier circuit 31 is accompanied by a substantially equal phase variation of the signal $E_S'$. The phase variation of the signal ($F_S'+F_C$) and that of the signal $E_S'$ are also equal to each other since the frequency $f_s$ of the signal $F_S'$ is fixed. Thus, the signal $E_S$ provided by the frequency converter circuit 30 is a modulated chrominance signal having color subcarriers with a fixed frequency of $f_s$ which is substantially free from phase variation. Consequently, the reproduced composite signal $E_C'$ contains the modulated chrominance signal $E_S$ free from phase variation, and can produce a color picture which is free from disagreement of hue.

Furthermore, since the amplitude of chrominance signal $E_S'$ is automatically controlled in accordance with variation in the amplitude of the pilot signal $F_P$, amplitude variation of the chrominance signal $E_S$ can be minimized, whereby to improve the fidelity of the resulting composite color video signal $E_C'$ in terms of saturation degree. In the example given, the band widths of the I and Q signals $E_I$ and $E_Q$ contained in the reproduced composite color video signal $E_C'$ are somewhat narrower than those of the original composite signal $E_C$, but this is substantially not critical. However, if any problem arises therefrom, it is only necessary to shift the frequency band of the frequency-modulated luminance signal $E_Y'$ to a higher frequency position to expand the frequency band between the signal $E_Y'$ and the pilot signal $F_P$ so that the frequency-converted chrominance signal $E_S'$ may be located within the thus expanded frequency band, taking into consideration the characteristics of the magnetic tape and magnetic head.

With the device described above, the composite color video signal is well recorded and reproduced but, during recording of the monochrome video signal, the pilot signal is also recorded and, during reproducing of such monochrome video signal, the recorded pilot signal exerts a bad influence on the reproduced picture.

The present invention avoids that problem by providing a magnetic video-recording and reproducing device which is simple in construction and is adapted to be automatically switched into its monochrome or color mode of operation in accordance with the kind of a signal to be recorded or reproduced.

Turning now to FIG. 4, a detailed description will now be given of one example of this invention. In FIG. 4 elements similar to those in FIGS. 1 and 2 are identified by the same reference numerals and will not be described in detail.

In the present example, the oscillator 10 is adapted for free-running oscillation, based upon the fact that the frequency $f_s$ of the signal $F_S$ derived from the oscillator 10 is located in interpolated relation to the harmonics of the Y signal and need not be synchronized with the color subcarrier frequency 3.58 MHz. Further, the signal $F_C$ is three times higher than the pilot signal $F_P$ and the frequency multiplier circuit 31 is provided in the reproducing system, so that the present example employs an oscillator 14*a* generating a pilot signal $F_P$, which signal is applied through a mixer 13 and a synthesizer circuit 15 to a magnetic head 16 to be recorded on a magnetic tape 17. In addition, one portion of the signal $F_P$ is fed to a playback amplifier 22 through coupling means, for example, a switch $S_1$ which closes only during recording and the pilot signal $F_P$ is derived from a band-pass filter 28. The pilot signal $F_P$ is applied to the frequency multiplier circuit 31 to produce a signal $F_C$ of 1.06 MHz. and the resultant signal $F_C$ is fed to a frequency converter 11 of the recording system to be superimposed on the signal $F_S$ derived from the oscillator 10, producing a signal ($F_S+F_C$). The resulting signal ($F_S+F_C$) is supplied to a frequency converter 8 through a record-playback changeover switch $S_2$ to produce a modulated chrominance signal $E_S'$ that a modulated chrominance signal $E_S$ has beaten down.

With such an arrangement, it is possible to eliminate the frequency-demultiplier circuit 14 and the oscillator 12 shown in FIG. 1. Further, the frequency variation of the pilot signal $F_P$ and that of the signal $F_C$ are interrelated, so that the recording and reproducing operations are stable. In addition, when the record-playback changeover switch $S_2$ and the switch $S_4$ are actuated to close playback contacts P, the oscillator 10 and the frequency converter 11 can be used as a signal source of the signal ($F_S+F_C$) supplied to the frequency converter 30 of the reproducing system.

The record-playback changeover switches $S_1$, $S_2$ and $S_4$ are ganged with the changeover switch $S_3$ of the magnetic head 16. The switch $S_4$ is provided in parallel relation to a switching control circuit $S_{C1}$ which is hereinafter described later. When the switch $S_4$ closes its record contact R, the signal $F_S$ from the oscillator 10 is supplied to frequency converter 11 through the switch $S_4$ but, when the switch $S_4$ closes its playback contact P, the signal $F_S$ is applied to the switching control circuit $S_{C1}$ to be controlled by the burst signal.

Thus, in accordance with the present invention, a television signal from a signal input terminal 1 is applied to a wide-band amplifier 2*a*, replaced for the low-pass filter 2, by which the television signal is uniformly amplified over the entire band covering the luminance signal and the chrominance signal. For example, a trap circuit T for removing the chrominance signal band is connected through a switching element St to the output side of the amplifier 2*a* in series or parallel relation to the transmission line. In the event that the signal supplied from the input terminal 1 is a color signal, the trap circuit T is connected to the transmission line and, when the input signal is a monochrome one, the trap circuit T is disconnected from the transmission line. Thus, the transmission characteristics of the luminance signal system are variably controlled so as to avoid deterioration of resolution of the monochrome signal. Further, switching control circuits $S_{C1}$ and $S_{C2}$ are respectively provided on the output sides of the oscillators 10 and 14*a*. During recording of a color signal, these switching control circuits are held in the "on" state to permit the passage therethrough of the signals $F_S$ and $F_P$ from the oscillators 10 and 14*a* to the frequency converter 11 and the mixer 13 and, during recording of a monochrome signal, the circuits $S_{C1}$ and $S_{C2}$ are held in the "off" state to inhibit the passage therethrough of the signals $F_S$ and $F_P$.

To this end, a burst signal $F_B$ from a burst signal pickup circuit 9 is supplied to a rectifier circuit D, and the rectified output of circuit D, amplified by a DC amplifier 37, if necessary, is employed for controlling the switching control circuits $S_{C1}$ and $S_{C2}$ and the switching element St. More specifically, in the event that a color signal is applied to the input terminal 1, a burst signal contained in the composite color signal is extracted by the burst signal pickup circuit 9 and is fed to the rectifier circuit D, as above described. The rectified output of the circuit D turns "on", the switching control circuits $S_{C1}$ and $S_{C2}$ and the switching element St to permit the passage therethrough of the signals $F_S$ and $F_P$ of the oscillators 10 and 14*a* and to allow the trap circuit T located on the output side of the wide-band amplifier 2*a* to be connected to the transmission line to remove the chrominance signal component $E_S$. In this manner, the recording system is put in its operative condition for color signal recording. In the event that a monochrome signal is supplied to the input terminal 1, no burst signal is detected in the output of the burst signal pickup circuit 9, so that no burst signal rectified output is contained in the output of the rectifier circuit D. Accordingly, the switching control circuits $S_{C1}$ and $S_{C2}$ and the switching element St are held in the off state and the oscillation signals $F_S$ and $F_P$ of the oscillators 10 and 14*a* are not applied to the frequency converter 11 and the mixer 13, with the result that the monochrome signal is not subjected to beat interference occurring between the monochrome signal and the signals of the oscillators 10 and 14*a*. The trap circuit T is disconnected from the transmission line to permit the passage of the high-frequency component of the monochrome signal, so that the monochrome signal can be recorded with high resolution. FIG. 5 shows a particular example of circuit T, in which the cathode of the switching element, that is, a diode in this case, is grounded and trap circuit T consists of a series resonance circuit resonating with, for example, 3.58 MHz., and being connected between the anode of the diode and the transmission line indicated by *l*. When a DC positive switching voltage is applied from a DC amplifier 37 to the connection point of the trap circuit T with the diode to turn on the diode, the trap circuit T is connected in parallel between the transmission line $l$ and ground to remove the components in the vicinity of 3.58 MHz. In the absence of the switching voltage, the diode remains in the off state to hold the trap circuit T in its inoperative condition and accordingly the high-frequency components in the vicinity of 3.58 MHz. are not removed.

Further, in accordance with the present invention, the gain of the chrominance signal system is controlled in dependence on the amplitude of the burst signal derived from the burst signal pickup circuit 9, thereby to achieve automatic control of color saturation. To perform this, the burst signal from the burst signal pickup circuit 9 is rectified by the rectifier circuit D and one portion of its rectified output is supplied to a gain control circuit 38. The output signal of gain control circuit 38 is applied to, for example, a band-pass filter 7 to control the amount of the chrominance signal passing therethrough in accordance with the amplitude of the burst signal in such a manner as to decrease the amount of the chrominance signal passing through the filter 7 when the amplitude of the burst signal is great and to increase the amount of the signal when the amplitude of the burst signal is small. Thus, a record signal of constant color saturation can be obtained.

During playback, the presence of the pilot signal derived from a band-pass filter 28 is detected, thereby to detect whether the signal to be reproduced is a color signal or a monochrome signal. In the case of the monochrome signal, the color signal transmission line or the power source therefor is cut off and the color signal system is actuated only during playback of the color signal.

For this purpose, one portion of the output of the detector circuit 29, which amplitude-detects the pilot system $F_P$ derived from the band-pass filter 28, is supplied to a DC amplifier 39. The output side of amplifier 39 is connected, for example, to a relay $R_L$ and, during playback of the color signal, the relay $R_L$ is energized by the detection of the pilot signal to render the color-signal system operative. More specifically, in the illustrated example, an operating current is respectively applied from a power source E to the band-pass filter 26, the amplitude control circuit 27 and the frequency converter 30 during playback of a color signal. During playback of the monochrome signal, the relay $R_L$ is deenergized to cut off the power source for the color-signal system.

Further, in accordance with the present invention, the chrominance signal is shifted down to a low-frequency band through the use of the pilot signal to avoid the phase change of the chrominance signal occurring in the recording and reproducing and, in addition, the recording and reproducing of the monochrome signal and color signal are automatically changed over as has been described above. Thus, the present invention is highly useful in practice.

During reproducing the oscillation output from the oscillator 10 of 3.58 MHz. is always supplied to the filter 36 and, upon detection of the pilot signal $F_P$, the color signal system is put in its operative condition, in which case the signal $F_C$ is derived from the multiplier circuit 31 and is superimposed on the signal $F_S$ of 3.58 MHz., so that the signal $(F_S+F_C)$ can be immediately supplied from the filter 36 to the frequency converter 30 to permit reproduction of the color signal without time lag. During playback of a monochrome signal the pilot signal $F_P$ is not reproduced, so that no operating power is applied to the color signal system and the multiplied signal $F_C$ of the pilot signal $F_P$ is not produced. Consequently, only the signal $F_S$ is supplied to the filter 36 but that signal is blocked from passage therethrough and a leakage component of 3.58 MHz. is supplied to the frequency converter 30. Since no operating power is applied to the frequency converter 30, the leakage component of 3.58 MHz. is not fed to the synthesizer circuit 35, so that, even if high-frequency components including 3.58 MHz. are present in the luminance signal of the monochrome signal during reproducing, there is no fear of causing beat interference and a stable monochrome television signal of high resolution can be reproduced.

Further, the switching control circuits $S_{C1}$ and $S_{C2}$ are provided on the output side of the oscillators 10 and 14$a$ and their oscillation signals are cut off during recording, by which the color signal recording operation can be immediately changed over to the monochrome signal-recording operation and vice versa to achieve stable recording, as has been described in the foregoing.

It will be apparent that many modifications and variations may be effected without departing from the scope of the novel concepts of this invention.

I claim as my invention:

1. A magnetic-recording and reproducing device for video signals comprising:

a. means for separating a luminance signal and a chrominance signal from a composite color video signal,
b. a composite color video signal transmission line having means therein for controlling the luminance signal transmission band,
c. means for frequency-modulating the separated luminance signal,
d. means for frequency-converting the separated chrominance signal to a frequency band juxtaposed to the lower limit of the frequency band of the frequency-modulated luminance signal,
e. means for producing a pilot signal with a frequency band lower than that of the frequency-converted chrominance signal,
f. means for combining said frequency-modulated luminance signal with said frequency-converted chrominance signal and pilot signal to provide a composite signal,
g. means for magnetically recording said composite signal,
h. means for extracting a burst signal from said separated chrominance signal, and
i. means for controlling said pilot signal producing means, said frequency-converting means and said luminance signal transmission band-controlling means so as to operate only in the presence of the burst signal.

2. A magnetic-recording and reproducing device for video signals as in claim 1, wherein the frequency-converting means is supplied with a signal from self-running oscillator means and the pilot signal.

3. A magnetic-recording and reproducing device for video signals as in claim 1, wherein said means for controlling the luminance signal transmission band is a trap circuit for removing the chrominance signal from the composite color video signal.

4. A magnetic-recording and reproducing device for video signals as in claim 1, further comprising means for controlling the level of the chrominance signal in accordance with the magnitude of the burst signal.

5. A magnetic-reproducing device for video signals comprising:

a. a magnetic medium having magnetically recorded thereon a frequency-demodulating luminance signal, a chrominance signal located in a frequency band lower than that of the luminance signal and a pilot signal located in a frequency band lower than that of the chrominance signal,
b. means for reproducing the recorded signals from the magnetic medium,
c. means for separating the reproduced signal into the luminance signal, the chrominance signal and the pilot signal,
d. means for modulating the luminance signal,
e. means for frequency converting the chrominance signal with the pilot signal and a signal derived from a self-running oscillator,
f. means for combining the frequency-converted chrominance signal with the demodulated luminance signal to provide a composite color video signal, and
g. means for rendering the frequency-converting means inoperative in the absence of the pilot signal.

6. A magnetic-recording and reproducing device for video signals comprising:

a. means for separating a composite color video signal into a luminance signal and a chrominance signal,
b. means for frequency modulating the luminance signal,
c. means for frequency converting the chrominance signal to a frequency band lower than that of the frequency-modulated luminance signal,
d. oscillator means for generating a pilot signal of a frequency lower than that of the frequency-converted chrominance signal,
e. means for mixing the pilot signal with a signal derived from a self-running oscillator,
f. means for combining together the frequency-modulated luminance signal, the frequency-converted chrominance signal and the pilot signal to provide a composite signal,
g. means for magnetically recording the composite signal on a magnetic medium through the record side of a first record-playback changeover switch,
h. means for extracting the pilot signal from the composite signal through switch means which is provided at the output side of the combining means and is closed only during recording,
i. means for supplying the pilot signal from the pilot signal extracting means to the mixing means,
j. a second record-playback changeover switch for supplying through its record contact the output of the mixing means to the frequency-converting means,
k. means for extracting a burst signal from the chrominance signal,
l. first control means for controlling the pilot signal generating means with the output of the burst-signal-extracting means,
m. second control means for controlling the output of the self-running oscillator with the output of the burst-signal-extracting means,
n. switch means provided in parallel with the second control means and closed only during reproducing,
o. means for interlocking the four changeover switch means,
p. means for supplying a signal reproduced from the magnetic medium to the pilot signal extracting means and separating the reproduced signal into the luminance signal and the chrominance signal,
q. means for demodulating the separated luminance signal,
r. means for frequency converting the chrominance signal with the signal passing through the playback contact of the second switch means,
s. means for mixing the frequency-converted chrominance signal with the demodulated luminance signal to provide a composite color video signal, and
t. means for controlling the frequency-converting means with the pilot signal derived from the pilot-signal-extracting means during reproducing.

* * * * *